2,961,729

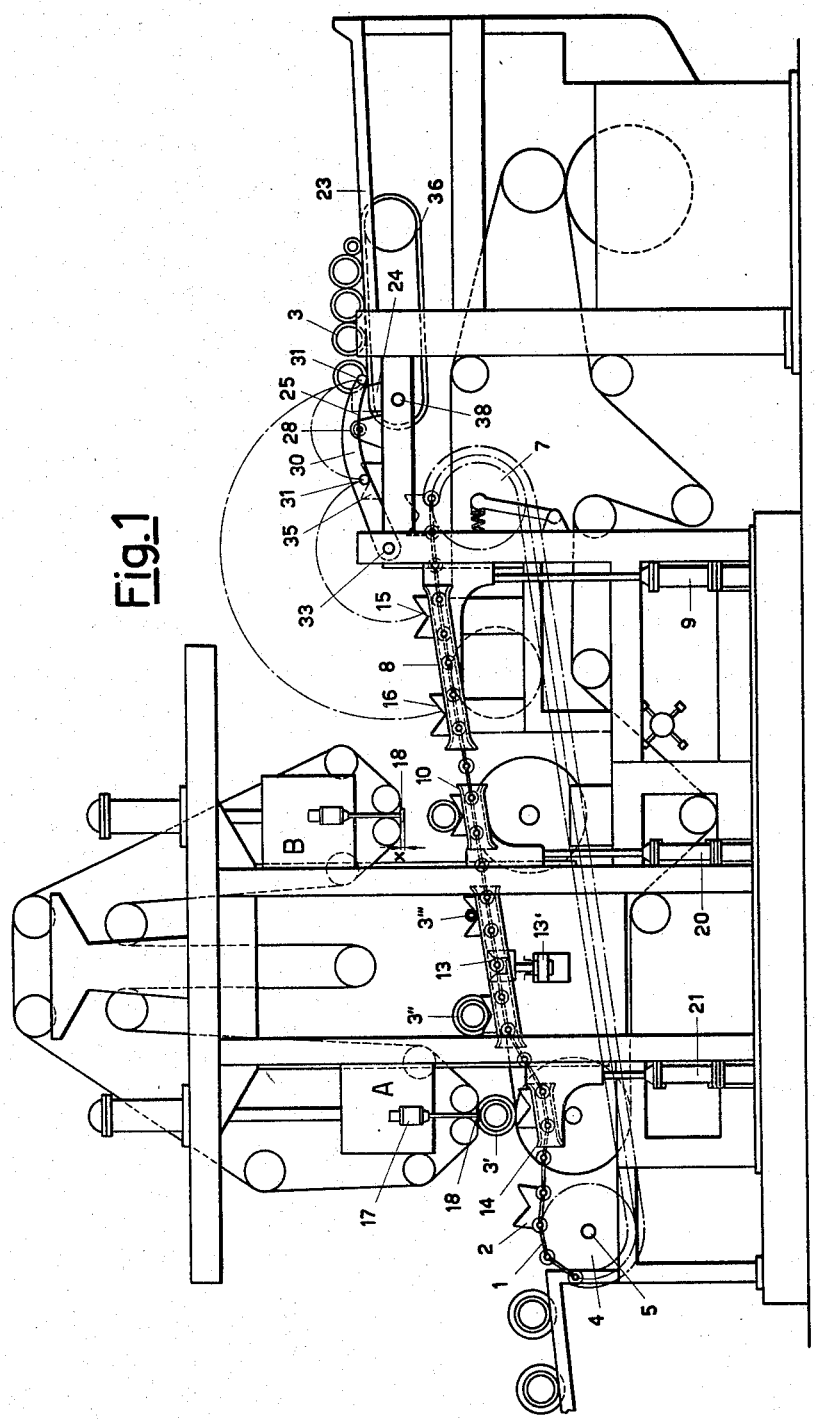

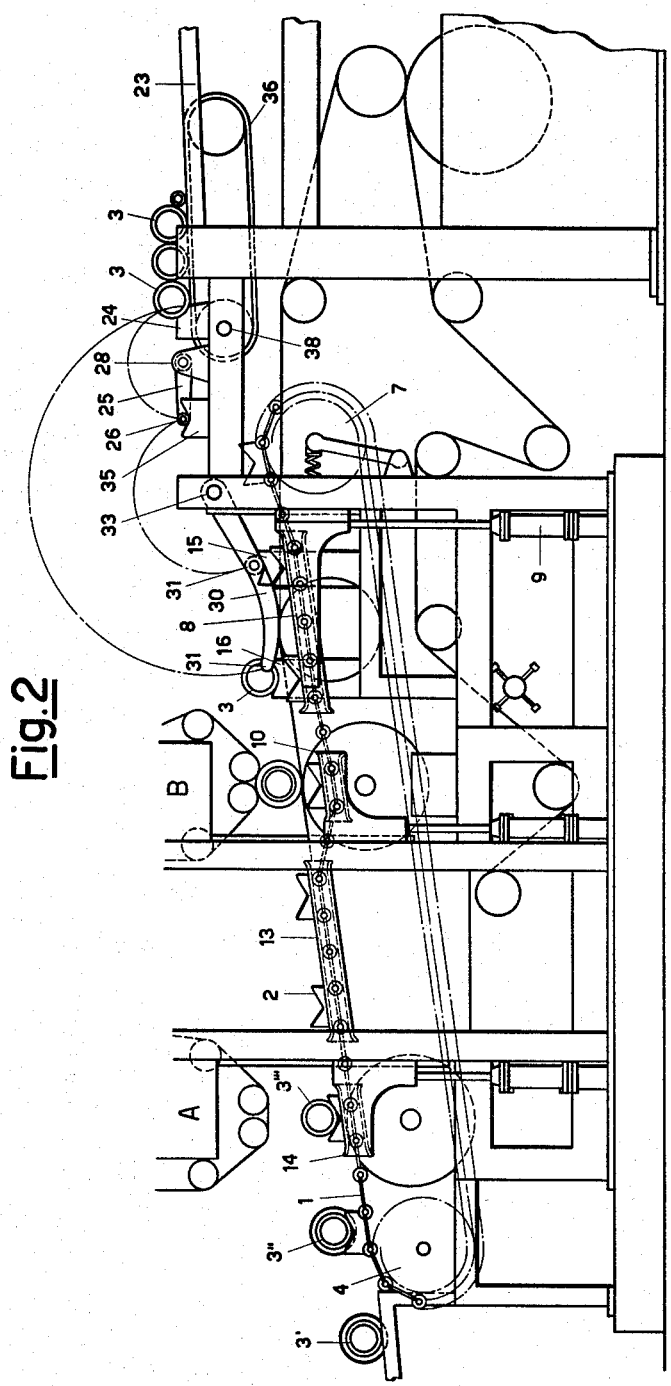

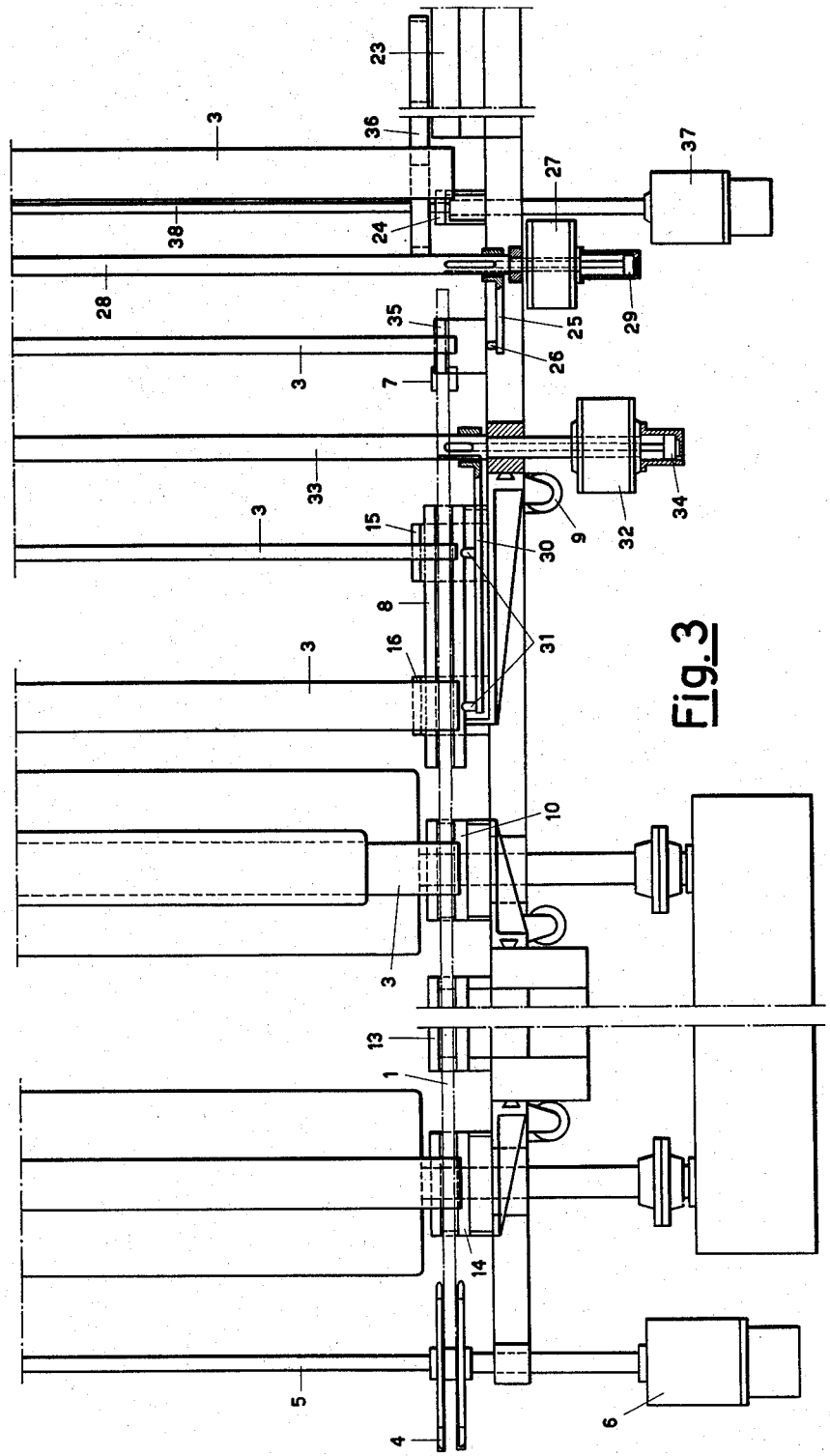

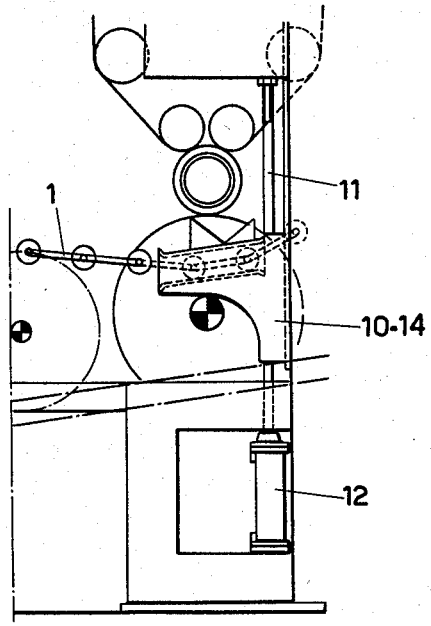
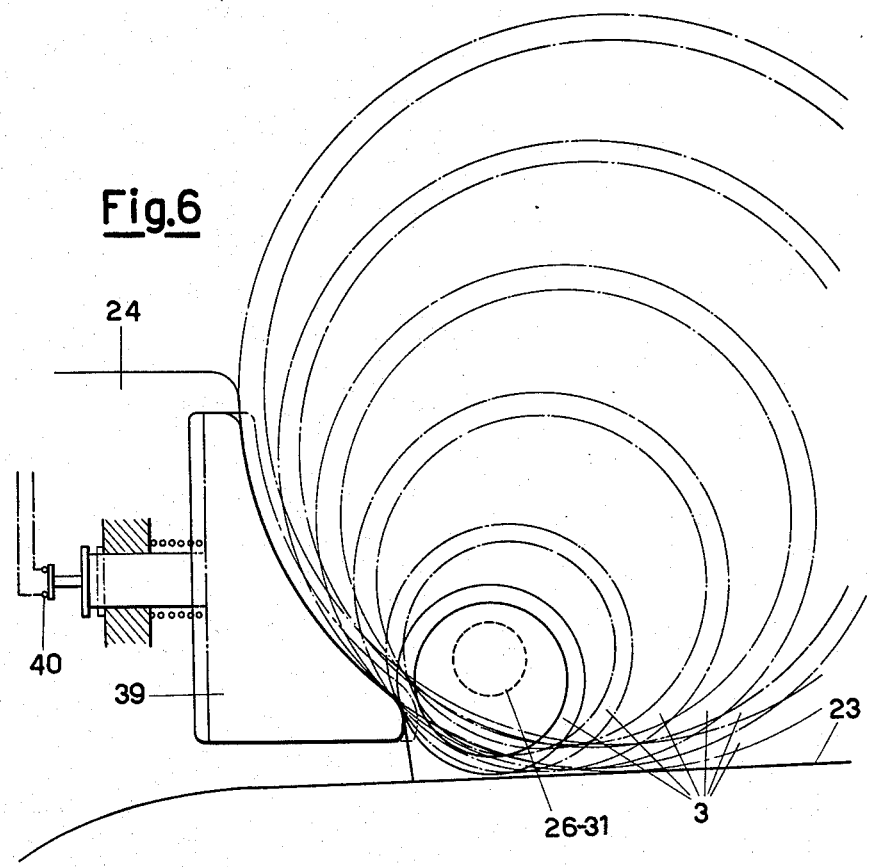

A MACHINE FOR THE MANUFACTURE OF PIPES WITH A DEVICE FOR FEEDING CYLINDRICAL MANDRELS ON WHICH THE PIPES ARE FORMED

Dante Colliva, Milan, Italy, assignor to S.p.A. Alessandro Calzoni, Milan, Italy, a company of Italy Filed Jan. 14, 1958, Ser. No. 708,951

Claims priority, application Italy Feb. 1, 1957

6 Claims. (Cl. 25—30)

It is an object of the present invention to provide a machine having two shaping devices arranged one after another for the continuous manufacture of asbestos pipes formed on tubular mandrels, and having a special feeding device adapted to take the mandrels from a collecting plane where they are kept successively in contact with one another, to carry them, without rolling, in the desired succession, under the individual shaping devices, and to bring them thereafter to the discharge following the forming of pipes on the mandrels.

One of the features of the machine is that it can make pipes of any diameter within the limits of the range for which the machine has been built, by utilizing mandrels of different diameters, and without having to modify the feeding device.

Another feature is that, while in conventional machines the feeding of the mandrels is effected by rolling trunnions at the opposite ends of the mandrels on fixed rails, with the machine embodying this invention, the mandrels are transported without rolling, and are directly supported on V-shaped saddles fixed to a pair of continuous chains, with sections of the chains being movable vertically in accordance with the operation of the shaping devices. The use of the saddles, which avoids the necessity of utilizing mandrels provided with trunnions at the opposite ends makes it possible to employ mandrels of any diameter within the range of diameters for which the machine is designed.

The machine embodying the invention is provided with a continuous conveyor having two laterally spaced chains carrying a series of saddles at intervals corresponding to one third of the distance between the shaping devices and running in guides which have fixed sections and sections movable vertically in accordance with the operation of the shaping devices; a storage plane disposed before said conveyor, and onto which are fed the shaping cylinders (mandrels) in contact with one another; a terminal stop on said plane for stopping the movement along the latter of the cylinders; a first pair of arms mounted rotatably about an axis parallel to that of the cylinders on the storage plane, with each arm carrying at its free end means for engaging with the first one of the cylinders disposed against the stop, and with the first pair of arms being controlled to perform a rotation by about 180° to take said engaged cylinder onto a support spaced from the stop; a second pair of arms mounted rotatably on an axis parallel to that of the first pair of arms and controlled to rotate by about 180° to contemporaneously transport the cylinder displaced by the first pair of arms and the cylinder that is then disposed against the stop, onto two successive saddles of the conveyor chains, each arm of the second pair of arms having means for engaging with the ends of the two cylinders to be transported; and means for controlling the advancement of the chains, the vertical movement of the mobile guide sections and the movement of the first and second pairs of arms in interdependent manner according to a predetermined sequence.

The above and other features, advantages and objects of the invention will appear in the following description of an embodiment of the invention illustrated by way of example in the accompanying drawings wherein:

Fig. 1 is a diagrammatic in side elevational view of a machine embodying the invention and having two successive shaping devices which are in their operative and inoperative conditions, respectively;

Fig. 2 is a view similar to Fig. 1, but with the successive shaping devices in their inoperative and operative conditions, respectively;

Fig. 3 is a diagrammatic partial plan view of the machine of Figs. 1 and 2;

Fig. 4 represents diagrammatically the device for lifting each of the movable guide sections;

Fig. 6 is a terminal stop for the cylinders fed, side by side on the collecting planes.

Figure 5:
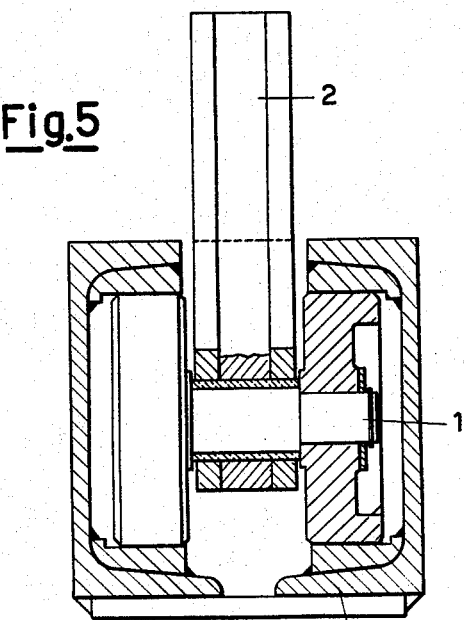
Fig. 5 is a detail transverse section showing the connection of the saddles with the chains.

In the following description, the term "pair" of elements refers to two elements which are placed at opposite sides.

The machine illustrated comprises—in addition to the two conventional shaping devices A and B placed one after another—a device for feeding the collecting cylinders or mandrels, constituted by a pair of chains, disposed one at each side of the machine and having a pitch which is a sub-multiple of the distance betwen the devices A and B.

At intervals corresponding to ⅓ of the distance between the devices A and B, each chain carries supporting saddles 2 having downwardly converging faces so as to be able to receive any diameter falling within the range of the collecting cylinders 3 fed at random, that is, without previous selection of the diameters and without adjustments.

The chains are driven by sprocket wheels 4 on a shaft 5 located at the discharge end of the machine and driven by the motor or engine 6.

At the opposite end of the machine the chains pass over sprocket wheels 7 mounted on a shaft movable toward and away from shaft 5 and yieldably urged away from the latter to tension the chains.

The upper runs of the chains run over four guides at each side, namely:

The guides 8, extending along a length of the chains corresponding to two saddles 2, and being movable vertically with their movement being controlled for instance by the pistons 9;

The guides 10, extending along a length of the chains corresponding to one saddle 2 and being located at the shaping device B, with the guides 10 being vertically movable by the push rods 11, which can be adjusted according to the diameter of the pipe to be shaped, in such a manner as to make the guides 10 depress the chains sufficiently so that the saddles 2 pass under the mandrel located in shaping device B during operation of the latter, as in Fig. 2, and the piston rods of hydraulic cylinders 12 which constantly oppose the action of push rods 11 and which raise the guides 10 so that the saddles 2 engage the mandrel when shaping device B is returned to its inoperative condition, as in Fig. 1;

The fixed guides 13 extending along a length of the chains included between two saddles 2 between the shaping devices A and B; and The guides 14 which extend along a length of the chains corresponding to one saddle 2 at the location of shaping device A, and which are movable vertically, and controlled in the same manner as the guides 10.

All of the guides 8—10—13—14 retain the chains 1 at the top and bottom, as shown in Fig. 5.

Each guide 13 includes a device 13' movable by a hydraulic motor to engage a pin of the related chain for locking the chain against movement along the guides.

At the location of the guides 8, there are provided two saddles 15, 16 which are fixed with a distance therebetween equal to the distance between adjacent saddles 2 and placed at such a height that the saddles 2—when they are moved upwards by the guides 8—can lift mandrels 3 resting on the saddles 15—16 for removal from the latter.

The device for transferring the mandrels 3 onto the saddles 15 and 16 includes a collecting plane or magazine disposed before the inlet end of the path of the chains defined by the sprocket wheels 7 and including two parallel guides or rails 23 on which the collecting cylinders or mandrels 3 can roll; conveniently shaped stops 24 at the ends of rails 23; a pair of rotary arms 25 having dowels 26 at their ends and being rotatable on a shaft 28 by a motor or engine 27, which for instance may be of the hydraulic cam lifter type, and also movable axially on the shaft 28, for instance by means of two small pistons 29, to introduce or to extract the dowels 26 into and from the open ends of the shaping cylinders or mandrels 3 which are formed by simple pipes; a pair of double rotary arms 30 mounted on a shaft 33 driven to rotate by the motor or engine 32, which for instance may be of the hydraulic cam lifter type, the two arms 30 and having dowels 31 extending therefrom at the free end and intermediate the length of the arm, and being movable axially on the shaft 33, for instance by means of two hydraulic pistons 34 to introduce or extract the dowels 31 into and from the open ends of the shaping cylinders or mandrels 3; and a pair of fixed supporting saddles 35 located to receive a mandrel from the arms 25 and to have that mandrel removed, in turn, by the dowels 31 located intermediate the length of the arms 30.

Further, it will be seen in Fig. 3, that, when the arms 25 are moved axially to extract the dowels 26 from the mandrels, the arms 25 and dowels 26 lie laterally outside the path of movement of the arms 30 so as to avoid interference with the latter.

The collecting cylinders or mandrels 3 are fed along the guides 23 by a pair of chains 36 which are driven by the motor or engine 37 through a shaft 38 carrying sprockets around which the chains 36 run.

Each of the two stops 24 carries a mobile element 39 shaped to conform to the contour of the stop 24, and which controls a remote control switch 40. Each element 39 is urged to a projecting position by a spring in order to maintain the related switch 40 in open condition. The two switches 40 are connected in parallel and arranged in such manner that the motor or engine 37 stops and remains at standstill only if both switches 40 are closed.

Figure 7:
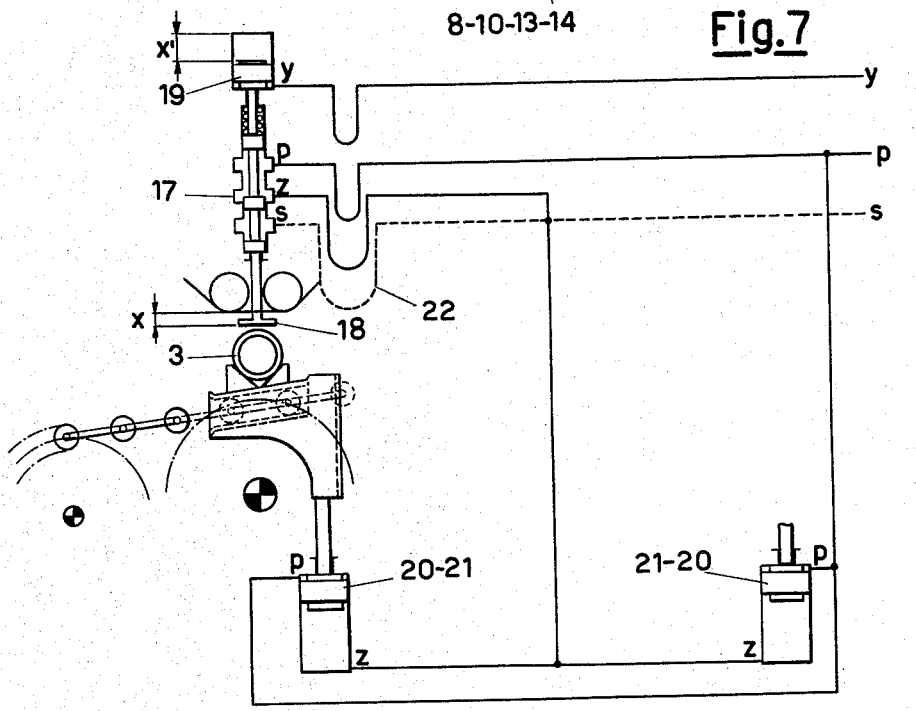
Fig. 7 is a diagram of a device for effecting the automatic hydraulic control of the cylinder-carrying guides in accordance with the shaping devices and with the servo-device for the individual shaping device.

As an alternative to the control of the vertical movement of guides 10 and 14 as illustrated in Fig. 4, each shaping device A and B is provided with a servomechanism which by way of example, is of the hydraulic type in the illustrated embodiment of Fig. 7.

The servomechanism (Fig. 7) includes a distributor 17 mounted on the shaping device and having a valve body urged downwardly by a spring and a stem extending from the valve body and terminating in a slide 18 which normally projects a distance X below the level of the bottom surface of the slurry carrying felt passing across the rolls of the related shaping device.

The valve body of the distributor 17 is also connected to a piston 19 moving in an hydraulic cylinder.

In the embodiment of Fig. 7, the two guides 10 are moved both vertically upward and downward by the pistons 20, one at each side of the machine, while the guides 14 are controlled in an analogous way by the pistons 21.

The flexible pipes 22 permit the vertical movements of the distributors 17 secured to the movable heads of the shaping devices. The pipe P is under pressure, the pipe S is for discharge, and the pipes Y and Z are control pipes.

The pistons 20 and 21 are of the kind having differential areas, with the upper area being smaller and always subjected to line pressure by way of the pipe P.

The machine described above operates as follows:

The collecting cylinders or mandrels 3 are advanced side by side along the guides 23 by means of the chains 36 driven by the motor or engine 37 and the foremost mandrel comes to rest against the pair of stops 24. In the position indicated in Figs. 1–2 the two mobile elements 39 of the stops are pressed by the first cylinder or mandrel, the switches 40 are closed and the motor 37 is inoperative.

When the foremost collecting cylinder or mandrel is taken from its position the mobile elements 39 in shifting opens the contacts of the switches 40, thereby causing starting of the motor 37 which, by driving the chain 36 carries forward the series of collecting cylinders 3 until the first one again engages the elements 39, closes the switches 40 and thus stops the motor 37.

Thus a collecting cylinder or mandrel is always disposed against both stops and, therefore, is in accurate position for being taken up by the automatic feeding device.

The two stops 24 are shaped in such manner that any collecting cylinder or mandrel having a diameter within the manufacturing range of the machine, will have its open ends disposed for receiving the dowels 26 or 31 (see Fig. 6).

When the saddles 2 of chains 1 have moved toward the shaping devices A and B, the two cylinders or mandrels 3 previously supported on the saddles 15 and 16, and the movement of chains 1 has stopped, the following controlled movements are performed in a continuous and automatic succession: (1) the introduction into the mandrel on supports 35 and the first mandrel on guides 23 of the dowels 31 of arms 30 by means of the pistons 34; (2) the rotation towards the saddles 15 and 16 of the arms 30 by means of the motor 32 from the position of Fig. 1 to the position of Fig. 2, thereby to deposit the two cylinders or mandrels onto the saddles 15 and 16; (3) the extraction of the dowels 31 from the cylinders or mandrels; (4) the return swinging towards the guides 23, of the arms 30.

When the arms 30 have moved, in stage (2), through such an angle as to lift the mandrel from the saddles 35, and the first mandrel from the guides 23, and another cylinder has moved into contact with the stops 24, the following controlled movements are performed in a continuous and automatic succession: (a) the introduction, into that mandrel or cylinder, of the dowels 26 of arms 25 by means of the pistons 29; (b) the rotation, towards the saddles 35, of the arms 25 by means of the motor 27 from the position of Fig. 1 to the position of Fig. 2 thereby to again deposit a mandrel onto the saddles 35; (c) the extraction of the dowels 26 from the mandrel resting on saddles 35; (d) the rotation, towards the guides 23, of the arms 25.

The above described stages (a), (b), (c) are performed at a speed such that stage (c) of the movement of arms 25 terminates prior to the end of the previously described stage (4) of the movements of the arms 30.

The cycle is repeated automatically every time the chains 1 of the machine stop after having moved towards the shaping devices A and B the cylinders or mandrels previously disposed on the saddles 15 or 16.

Fig. 1 represents the machine with the shaping device A in shaping or operative condition and with the shaping device B at rest or inoperative.

A little before the pipe being shaped by device A has attained the desired thickness wanted, the head of device B is lowered thereby causing, automatically, the lowering of the guides 10 by means of the push-rods 11 and of the guides 8 for instance by means of the pistons 9 actuated by the same pressure which is fed to the bottom of the actuating pistons of shaping device B. The empty cylinders or mandrels 3 which may find themselves in the two saddles carried by the portions of the chains in the guides 8 while these are lowered, come to rest on the saddles 15 and 16. Thus the shaping of the pipe by the device B is started. When the pipe being shaped on a mandrel by the device A has attained the desired thickness by collecting the layer of mix existing on the felt between devices B and A, the device A is controlled so that its head is lifted, while automatically the guides 14 are also lifted by means of the pistons 12 through a stroke sufficient to bring the chains 1 in alignment with the fixed guides 13 and the tangents to the sprocket wheels 4 (see Fig. 2).

At the end of the upward stroke of the device A, the automatic control of the motor 6 is actuated to rotate sprocket wheels 4 sufficiently to cause displacement of chains 1 through a distance corresponding to the distance between two saddles 2, whereupon motor 6 stops automatically.

The new position of the saddle carrying chains is that represented in Fig. 2.

Thus, the cylinders 3' and 3" are taken out of the machine with the pipes thereon shaped respectively by the devices A and B, and an empty cylinder or mandrel 3'" is brought to the location of shaping device A.

The chains 1, during their movement from the position of Fig. 1 to the position of Fig. 2, have not influenced the position of the cylinder or mandrel having a pipe shaped thereon by the device B or of the cylinders or mandrels on the saddles 15 and 16, because the guides 8 and 10 were lowered during the chain movement, as described above. When the pipe being shaped by the device B has attained the desired thickness, the head of device B is lifted and the head of device A is lowered, as in Fig. 1, while the guides 8 and 10 are lifted so as to bring the chains 1 in alignment with the tangent to the wheels 7 and the guides 13.

The two saddles 2 on the portion of chains 1 engaged by the guides 8 lift the cylinders from the guides 15 and 16. At the end of upward stroke of the head of shaping device B, the motor 6 is controlled automatically, to effect the further advance of chains 1, as previously described.

The new position of the feeder chains is that represented in Fig. 1.

Thus, the cylinder or mandrel carrying the pipe shaped by the device B is brought to the position 3" (Fig. 1), an empty cylinder is brought to the position 3'" (Fig. 1) and another empty cylinder is located in the shaping device B. The cylinder 3" (Fig. 2) with the shaped pipe thereon is carried on to discharge guides.

The chains in their movement have not influenced the position of the cylinder or mandrel having a pipe shaped thereon by the device A, because the guides 14 had been lowered with the lowering of the head of device A, as previously described (Fig. 1).

Following the last described movement of the chains, the two saddles dwelling in the guides 8 must be supplied with two empty cylinders or mandrels, in the manner referred to at the beginning of this description of operation.

The locking devices 13' of the chains are automatically released when the chains are moved, and are locked again at the end of the movement.

When the shaping devices A and B each have a servomechanism of the kind described above with reference to Fig. 7, the same operates as follows:

In the normal raised position of the head of the shaping device, the distributor 17 places the pipe Z under pressure and, therefore, pressure acts under the pistons 20 or 21 to raise the latter and, consequently also the guides 10 or 14. When the head of the shaping device is lowered, owing to the distance X, the slide 18 contacts the collecting cylinder or mandrel 3 before the felt contacts the latter.

This contact causes the displacement upwards of the valve body of the distributor 17, so that the pipe Z is connected to discharge and the pressure in pipe P lowers the pistons 20 or 21 and, therefore, the guides 10 or 14.

When the mandrel 3 is contacted by the lower surface of the felt, the shaping of a pipe is started and, by sending pressure into pipe Y, the piston 19 lifts the valve body of the distributor 17 by an amount X' greater than X to keep the pipe Z connected to discharge during the entire shaping operation and, therefore, to maintain the pistons 20 or 21 and the guides 10 or 14 at their lowermost positions without requiring contact between slide 18 and the mandrel on which the pipe is being formed.

When the shaping of the pipe is completed, the head of the shaping device is lifted, and pipe Y is again connected to discharge so that the spring again urges the slide 18 against the mandrel and raises the pistons 20 or 21 and the guides 10 or 14 as the respective head of the shaping device moves upwardly.

I claim:

1. In a machine for forming pipes on tubular mandrels; the combination of first and second spaced apart shaping devices which are alternately operated, each of said shaping devices including a vertically movable head which is lowered and raised when the shaping device is operative and inoperative, respectively, and a back-up cylinder disposed below said head and rotatable about a fixed axis, conveying means including flexible chains running past said shaping devices and carrying saddles adapted to support the tubular mandrels and spaced apart by a distance equal to one-third the distance between said shaping devices, means for effecting the intermittent advancement of said chains through distances equal to twice the spacing between successive saddles and effective to bring the latter to rest with saddles of said conveying means located at said first and second shaping devices, respectively, first and second vertically movable guides engaging said chains at the locations of said first and second shaping devices, actuating means for each of said movable guides effective to lower the latter below the top of the back-up cylinder of the related shaping device whenever the latter is operative, so that said saddles on the chains can then pass under a mandrel having a pipe shaped thereon between said head and back-up cylinder of said related shaping device, and to raise the movable guide during inoperativeness of said related shaping device so that said saddles can then carry mandrels into and out of the related shaping device, guide rails for the mandrels terminating adjacent said chains in advance of said first shaping device, stop means at the ends of said guide rails for engagement by the foremost mandrel on the latter, first support means located between said guide rails and said chains, a first pair of pivoted arms having mandrel engaging elements at their free ends and being swingable between two positions where said elements engage the foremost mandrel against said stop means and where the engaged mandrel is deposited on said first support means, respectively, second and third support means located in advance of said first shaping device to register with two of said saddles whenever said chains are at rest, a second pair of pivoted arms having mandrel engaging elements at spaced apart locations and being swingable between two positions where said elements of the second pair of arms simultaneously engage the foremost mandrel against said stop means and the mandrel on said first support means, and where both engaged mandrels are deposited on said second and third support means, and vertically movable guide means engaging said chains at the locations of said second and third support means so that, when the last mentioned movable guide means is lowered, said chains can advance simultaneously with the deposit of mandrels on said second and third support means and, when said last movable guide means is raised, said saddles registering with the second and third support means pick up the mandrels from the latter for subsequent transport to the shaping devices.

2. In a machine for forming pipes on tubular mandrels; the combination as in claim 1; wherein said actuating means for each movable guide includes means yieldably urging the latter upwardly, and a push rod depending from said head of the related shaping device and engageable with said movable guide means to lower the latter when the head is lowered and to permit the guide means to rise when the head is raised.

3. In a machine for forming pipes on tubular mandrels; the combination as in claim 1, wherein said actuating means for each movable guide includes a servomechanism having hydraulic means for raising and lowering said movable guide, a distributing valve controlling the supply of fluid under pressure to said hydraulic means and including a valve body yieldably urged downwardly to a position causing said hydraulic means to raise said movable guide means, a stem extending from said valve body and engageable with a mandrel at the related shaping device to move said valve body upwardly during lowering of the head to a position causing said hydraulic means to lower said guide means, and hydraulically operated means moving said valve body further upwards to disengage said stem from the mandrel during the shaping of a pipe on the latter for maintaining the related guide means in lowered position.

4. In a machine for forming pipes on tubular mandrels; the combination as in claim 1, wherein said stop means is adapted to arrest the movement along said guide rails of mandrels having different diameters and has an arcuate face in the shape of a section of a circle tangent to said guide rails and with a diameter as large as that of the largest mandrel to be employed in the machine, said stop means being disposed so that said mandrel engaging elements of said first pair of pivoted arms will enter the foremost mandrel on said guide rails irrespective of the diameter of that foremost mandrel.

5. In a machine for forming pipes on tubular mandrels; the combination as in claim 4, further comprising means for advancing the mandrels along said guide rails toward said stop means, movable control elements normally projecting beyond said arcuate face and having the same shape as the latter to be depressed by engagement by the foremost mandrel on the guide rails, and control means for the mandrel advancing means halting operation of the latter when said movable control elements are depressed.

6. In a machine for forming pipes on tubular mandrels; the combination as in claim 1, further comprising fixed guides for said chains engaging the latter between said first and second shaping devices and located so as to define a continuation of the path for said chains defined by said first and second vertically movable guides in the raised positions of the latter.

References Cited in the file of this patent

UNITED STATES PATENTS

| 2,679,748 | Kent et al. | June 1, 1954 |
| 2,776,450 | Boggs | Jan. 8, 1957 |
| 2,802,586 | Wingard | Aug. 13, 1957 |

FOREIGN PATENTS

| 977,925 | France | Nov. 15, 1950 |
| 1,062,188 | France | Dec. 2, 1953 |
| 1,141,729 | France | Mar. 18, 1957 |
| 416,595 | Germany | July 21, 1925 |